(12) United States Patent
Xue

(10) Patent No.: US 9,854,472 B2
(45) Date of Patent: Dec. 26, 2017

(54) COOPERATIVE COMMUNICATION METHOD, CLOUD SERVER, AND CORE NETWORK SERVER

(71) Applicant: Huawei Technologies Co., Ltd., Shenzhen (CN)

(72) Inventor: Li Xue, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 168 days.

(21) Appl. No.: 14/830,986

(22) Filed: Aug. 20, 2015

(65) Prior Publication Data

US 2015/0358858 A1 Dec. 10, 2015

Related U.S. Application Data

(63) Continuation of application No. PCT/CN2014/091754, filed on Nov. 20, 2014.

(30) Foreign Application Priority Data

Apr. 29, 2014 (CN) .......................... 2014 1 0177627

(51) Int. Cl.
*H04L 1/00* (2006.01)
*H04W 28/08* (2009.01)
(Continued)

(52) U.S. Cl.
CPC .............. *H04W 28/08* (2013.01); *H04L 45/24* (2013.01); *H04L 47/2416* (2013.01);
(Continued)

(58) Field of Classification Search
CPC ...... H04B 7/00; H04B 7/2121; H04B 7/2123; H04B 7/18528; H04B 7/18571;
(Continued)

(56) References Cited

U.S. PATENT DOCUMENTS

2006/0235716 A1* 10/2006 Mahesh ................ G06F 19/321
709/204
2013/0242783 A1 9/2013 Horn et al.
(Continued)

FOREIGN PATENT DOCUMENTS

CN 102595580 A 7/2012
CN 103068048 A 4/2013
(Continued)

OTHER PUBLICATIONS

Foreign Communication From a Counterpart Application, Korean Application No. 10-2015-7025834, Korean Office Action dated Aug. 3, 2016, 4 pages.
(Continued)

*Primary Examiner* — Dady Chery
(74) *Attorney, Agent, or Firm* — Conley Rose, P.C.

(57) ABSTRACT

A cooperative communication method includes determining bandwidth of a first wireless network that user equipment (UE) currently accesses, determining bandwidth required by data to be sent to the UE, and when the bandwidth of the first wireless network cannot meet the bandwidth required by the to-be-sent data, sending a first part of data packets to the first wireless network, and sending a second part of the data packets to at least one core network, so that the at least one core network sends the second part of the data packets to the UE using at least one wireless network, where a communications protocol of the first wireless network is different from that of the at least one wireless network. Bandwidth resources can be integrated on wireless networks with different communications protocols, so that fluent transmission of data can be implemented.

12 Claims, 6 Drawing Sheets

(51) Int. Cl.

| | | |
|---|---|---|
| *H04L 12/707* | (2013.01) | |
| *H04L 12/853* | (2013.01) | |
| *H04L 29/06* | (2006.01) | |
| *H04N 21/238* | (2011.01) | |
| *H04N 21/24* | (2011.01) | |
| *H04N 21/462* | (2011.01) | |
| *H04N 21/63* | (2011.01) | |
| *H04W 28/02* | (2009.01) | |
| *H04L 12/811* | (2013.01) | |

(52) U.S. Cl.
CPC ........ *H04L 65/4084* (2013.01); *H04L 65/602* (2013.01); *H04L 65/80* (2013.01); *H04N 21/238* (2013.01); *H04N 21/2402* (2013.01); *H04N 21/4622* (2013.01); *H04N 21/631* (2013.01); *H04L 47/38* (2013.01); *H04W 28/0226* (2013.01)

(58) Field of Classification Search
CPC ......... H04B 7/18576; H04J 2203/0069; H04Q 2213/394; H04W 72/04; H04W 72/12; H04W 76/00; H04W 84/06; H04L 47/70; H04L 47/72; H04L 47/74
USPC ........ 370/230–235, 328–347, 310, 352–356; 455/422.1, 424–425, 450–453, 509, 517, 455/560–562.1, 550.1; 709/223, 249
See application file for complete search history.

(56) References Cited

U.S. PATENT DOCUMENTS

| | | | |
|---|---|---|---|
| 2013/0322367 A1 | 12/2013 | Kang et al. | |
| 2014/0071920 A1 | 3/2014 | Kamei et al. | |
| 2014/0256338 A1 | 9/2014 | Xu et al. | |
| 2015/0201373 A1 | 7/2015 | Fu et al. | |
| 2015/0373672 A1* | 12/2015 | Forssell | H04L 47/76 370/329 |

FOREIGN PATENT DOCUMENTS

| | | |
|---|---|---|
| CN | 103202060 A | 7/2013 |
| CN | 103563466 A | 2/2014 |
| CN | 103974328 A | 8/2014 |
| WO | 2013010005 A1 | 1/2013 |
| WO | 2013062297 A1 | 5/2013 |
| WO | 2014047942 A1 | 4/2014 |

OTHER PUBLICATIONS

Foreign Communication From a Counterpart Application, Korean Application No. 10-2015-7025834, English Translation of Korean Office Action dated Aug. 3, 2016, 2 pages.
Foreign Communication From a Counterpart Application, Korean Application No. 10-2015-7025834, Korean Notice of Allowance dated Dec. 9, 2016, 3 pages.
Partial English Translation and Abstract of Chinese Patent Application No. CN102595580, Aug. 26, 2015, 4 pages.
Partial English Translation and Abstract of Chinese Patent Application No. CN103974328, Aug. 26, 2015, 3 pages.
Foreign Communication From a Counterpart Application, PCT Application No. PCT/CN2014/091754, English Translation of International Search Report dated Feb. 9, 2015, 3 pages.
Foreign Communication From a Counterpart Application, PCT Application No. PCT/CN2014/091754, Written Opinion dated Feb. 9, 2015, 6 pages.
Foreign Communication From a Counterpart Application, Chinese Application No. 10520101730, Chinese Office Action dated Jan. 29, 2016, 4 pages.

* cited by examiner

COOPERATIVE COMMUNICATION METHOD, CLOUD SERVER, AND CORE NETWORK SERVER

CROSS-REFERENCE TO RELATED APPLICATION

This application is a continuation of International Application No. PCT/CN2014/091754, filed on Nov. 20, 2014, which claims priority to Chinese Patent Application No. 201410177627.4, filed on Apr. 29, 2014, both of which are hereby incorporated by reference in their entireties.

TECHNICAL FIELD

The present disclosure relates to the communications field, a cooperative communication method, a cloud server, and a core network server.

BACKGROUND

With the development of a network technology and the improvement of a sharing platform, a user has a growing number of requirements on multimedia data of a standard definition, a high definition, and the like, and has an increasingly high requirement for media data quality. Real-time data such as multimedia requires a network to have broadband with large data traffic and network quality with relatively high stability. However, for a wireless network, problems always exist in high bandwidth and high stability.

In one aspect, a conventional wireless local area network, second generation (2G) network, or third generation (3G) network, or a Long Term Evolution (LTE) network that is being laid out for commercial use is expanding wireless network bandwidth. In another aspect, they are deployed separately; a single system can partially solve a transmission problem, but cannot fully meet an actual requirement for high bandwidth and high stability.

Along with a higher requirement for network bandwidth and a requirement for stable transmission of real-time data such as multimedia by a wireless network, due to factors such as instability of a wireless network and isolation between wireless networks, wireless transmission performance is unstable, and wireless bandwidth cannot meet a requirement for fluent transmission of real-time data.

SUMMARY

Embodiments of the present disclosure provide a cooperative communication method, a cloud server, and a core network server, which can integrate bandwidth resources on wireless networks with different communications protocols, so that fluent transmission of real-time data can be implemented.

According to a first aspect, a cooperative communication method is provided, where the method is executed by a cloud server, the cloud server is connected to multiple core networks, and the method includes: determining bandwidth of a first wireless network that user equipment (UE) currently accesses; determining bandwidth required by data to be sent to the UE; and when the bandwidth of the first wireless network cannot meet the bandwidth required by the to-be-sent data, sending a first part of data packets to the first wireless network, and sending a second part of the data packets to at least one core network, so that the at least one core network sends the second part of the data packets to the UE using at least one wireless network, where the first part of the data packets and the second part of the data packets belong to the to-be-sent data, and a communications protocol of the first wireless network is different from that of the at least one wireless network.

With reference to the first aspect, in a first possible implementation manner, when the bandwidth of the first wireless network cannot meet the bandwidth required by the to-be-sent data, before the sending a first part of data packets to the first wireless network, the method further includes: sending a request message to at least one core network server of the at least one core network, where the request message is used to request the at least one core network to provide bandwidth support, and the request message carries an identifier of the UE and location information of a cell in which the UE is located; receiving feedback information sent by the at least one core network server, where the feedback information includes bandwidth provided by the at least one wireless network; and determining the first part of the data packets and the second part of the data packets according to the bandwidth provided by the at least one wireless network and the bandwidth of the first wireless network.

With reference to the first possible implementation manner, in a second possible implementation manner, the to-be-sent data at least includes: a data packet with a first compression rate and a data packet with a second compression rate, where the first compression rate is less than the second compression rate; the bandwidth required by the to-be-sent data includes: bandwidth required by the data packet with the first compression rate in the to-be-sent data; when the bandwidth provided by the at least one wireless network and the bandwidth of the first wireless network meet the bandwidth required by the data packet with the first compression rate in the to-be-sent data, the first part of the data packets and the second part of the data packets both are data packets with the first compression rate; and when the bandwidth provided by the at least one wireless network and the bandwidth of the first wireless network cannot meet the bandwidth required by the data packet with the first compression rate in the to-be-sent data, some or all data packets in both the first part of the data packets and the second part of the data packets are data packets with the second compression rate.

With reference to the first aspect or the first or second possible implementation manner, in a third possible implementation manner, the method further includes: receiving a performance parameter of the first wireless network reported by the UE, where the determining bandwidth of a first wireless network that UE currently accesses includes: determining the bandwidth of the first wireless network according to the performance parameter of the first wireless network.

According to a second aspect, a cooperative communication method is provided, where the method includes: receiving a request message sent by a cloud server, where the request message is used to request bandwidth support, and the request message includes an identifier of UE and location information of a cell in which the UE is located; determining, according to the request message, wireless bandwidth that a wireless network can provide for the UE; and sending a feedback message to the cloud server, where the feedback message carries the wireless bandwidth.

With reference to the second aspect, in a first possible implementation manner of the second aspect, the determining, according to the request message, wireless bandwidth that a wireless network can provide for the UE includes: determining, according to the location information of the cell in which the UE is located, a wireless network on which the UE is located; establishing a connection to a base station on the wireless network; and acquiring, from the base station, the wireless bandwidth that the wireless network can provide for the UE.

With reference to the second aspect or the first possible implementation manner of the second aspect, in a second possible implementation manner of the second aspect, the method further includes: receiving data sent by the cloud server; and sending the data to the UE using the wireless network.

According to a third aspect, a cloud server is provided, where the cloud server is connected to multiple core networks, and the cloud server includes: a determining module configured to determine bandwidth of a first wireless network that UE currently accesses, and further configured to determine bandwidth required by data to be sent to the UE; and a sending module configured to, when the bandwidth of the first wireless network determined by the determining module cannot meet the bandwidth required by the to-be-sent data, send a first part of data packets to the first wireless network, and send a second part of the data packets to at least one core network, so that the at least one core network sends the second part of the data packets to the UE using at least one wireless network, where the first part of the data packets and the second part of the data packets belong to the to-be-sent data, and a communications protocol of the first wireless network is different from that of the at least one wireless network.

With reference to the third aspect, in a first possible implementation manner of the third aspect, the sending module is further configured to: when the bandwidth of the first wireless network cannot meet the bandwidth required by the to-be-sent data, before the first part of the data packets is sent to the first wireless network, send a request message to at least one core network server of the at least one core network, where the request message is used to request the at least one core network to provide bandwidth support, and the request message carries an identifier of the UE and location information of a cell in which the UE is located; and the cloud server further includes: a receiving module configured to receive feedback information sent by the at least one core network server, where the feedback information includes bandwidth provided by the at least one wireless network, where the determining module is further configured to determine the first part of the data packets and the second part of the data packets according to the bandwidth provided by the at least one wireless network and the bandwidth of the first wireless network.

With reference to the first possible implementation manner of the third aspect, in a second possible implementation manner of the third aspect, the to-be-sent data at least includes: a data packet with a first compression rate and a data packet with a second compression rate, where the first compression rate is less than the second compression rate; the bandwidth required by the to-be-sent data includes: bandwidth required by the data packet with the first compression rate in the to-be-sent data; when the bandwidth provided by the at least one wireless network and the bandwidth of the first wireless network meet the bandwidth required by the data packet with the first compression rate in the to-be-sent data, the first part of the data packets and the second part of the data packets both are data packets with the first compression rate; and when the bandwidth provided by the at least one wireless network and the bandwidth of the first wireless network cannot meet the bandwidth required by the data packet with the first compression rate in the to-be-sent data, some or all data packets in both the first part of the data packets and the second part of the data packets are data packets with the second compression rate.

With reference to the third aspect or the first or second possible implementation manner of the third aspect, in a third possible implementation manner of the third aspect, the receiving module is further configured to receive a performance parameter of the first wireless network reported by the UE, where the determining module is configured to determine the bandwidth of the first wireless network according to the performance parameter of the first wireless network.

According to a fourth aspect, a core network server is provided, where the core network server includes: a receiving module configured to receive a request message sent by a cloud server, where the request message is used to request bandwidth support, and the request message includes an identifier of UE and location information of a cell in which the UE is located; a determining module configured to determine, according to the request message, wireless bandwidth that a wireless network can provide for the UE; and a sending module configured to send a feedback message to the cloud server, where the feedback message carries the wireless bandwidth.

With reference to the fourth aspect, in a first possible implementation manner of the fourth aspect, the determining module includes: a determining unit configured to determine, according to the location information of the cell in which the UE is located, a wireless network on which the UE is located; a connecting unit configured to establish a connection to a base station on the wireless network; and an acquiring unit configured to acquire, from the base station, the wireless bandwidth that the wireless network can provide for the UE.

With reference to the fourth aspect or the first possible implementation manner of the fourth aspect, in a second possible implementation manner of the fourth aspect, the receiving module is further configured to receive data sent by the cloud server; and the sending module is further configured to send the data to the UE using the wireless network.

Based on the foregoing technical solutions, when bandwidth of a currently accessed wireless network cannot meet bandwidth required by data transmission, a part of data is sent by a core network to user equipment using a wireless network connected to the core network, which can integrate bandwidth resources on wireless networks with different communications protocols, so that fluent transmission of data can be implemented.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as: a Global System of Mobile Communications (GSM) system, a Code Division Multiple Access (CDMA) system, a Wideband Code Division Multiple Access (WCDMA) system, a general packet radio service (GPRS), an LTE system, an LTE frequency division duplex (FDD) system, an LTE time division duplex (TDD), a Universal Mobile Telecommunication System (UMTS), or a Worldwide Interoperability for Microwave Access (WiMAX) communications system.

The embodiments of the present disclosure may be used in wireless networks with different communications protocols. A wireless access network may include different network elements in different systems. For example, a network element on a wireless access network in LTE and LTE-Advanced includes an evolved Node B (eNB), a network element on a wireless access network in WCDMA includes an Radio Network Controller (RNC) and a Node B, and a network element on a wireless local area network includes an access point (AP). Similarly, another wireless network such as WiMAX may also use solutions similar to those in the embodiments of the present application, only that a related module in a base station system may be different. No limitation is set by the embodiments of the present application.

It should further be understood that in the embodiments of the present application, UE may be but is not limited to a mobile station (MS), a mobile terminal, a mobile telephone, a handset, a portable equipment, and the like. The user equipment may communicate with one or more core networks, such as a computer, using a radio access network (RAN); the user equipment may further be a portable, pocket-sized, handheld, computer built-in, or vehicle-mounted mobile apparatus. The user equipment may be a mobile phone (or referred to as a "cellular" phone), or a computer having a wireless communications function; and the user equipment may further be a portable, pocket-sized, handheld, computer built-in, or vehicle-mounted mobile apparatus.

Figure 1:
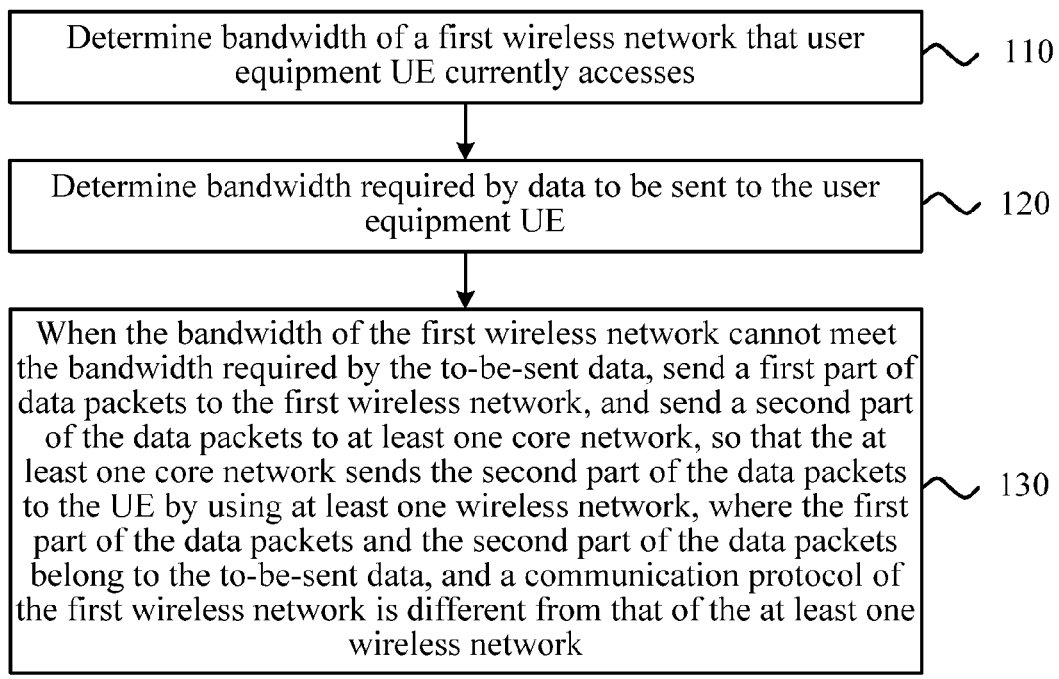
FIG. 1 is a schematic flowchart of a cooperative communication method according to an embodiment of the present disclosure.

FIG. 1 shows a schematic flowchart of a cooperative communication method 100 according to an embodiment of the present disclosure. The method 100 may be executed by a cloud server, and the cloud server is connected to multiple core networks. As shown in FIG. 1, the method 100 includes the following content Step 110: Determine bandwidth of a first wireless network that UE currently accesses.

The wireless network may be a wireless local area network, or may be a 2G network, a 3G network, an LTE network, or the like. The cloud server may determine the bandwidth of the wireless network according to a monitoring parameter and a relevant calculation model of the wireless network.

Step 120: Determine bandwidth required by data to be sent to the UE.

For example, the data may be real-time data such as high-definition or standard-definition multimedia. The to-be-sent data may be data that needs to be sent within a next time frame. Bandwidth required by the data to be sent to the UE within the next time frame may be determined according to a playback progress of the multimedia real-time data.

Step 130: When the bandwidth of the first wireless network cannot meet the bandwidth required by the to-be-sent data, send a first part of data packets to the first wireless network, and send a second part of the data packets to at least one core network, so that the at least one core network sends the second part of the data packets to the UE using at least one wireless network, where the first part of the data packets and the second part of the data packets belong to the to-be-sent data, and a communications protocol of the first wireless network is different from that of the at least one wireless network.

The at least one wireless network is connected to the foregoing at least one core network. For example, when the first wireless network may be a wireless local area network, the at least one wireless network may be a 2G network, a 3G network, an LTE network, or the like.

Therefore, in the cooperative communication method in this embodiment of the present disclosure, when bandwidth of a currently accessed wireless network cannot meet bandwidth required by data transmission, bandwidth support is requested from a core network, so that some data is sent to user equipment by the core network using a wireless network connected to the core network, which can integrate bandwidth resources on wireless networks with different communications protocols, so that fluent transmission of data can be implemented.

Figure 2:
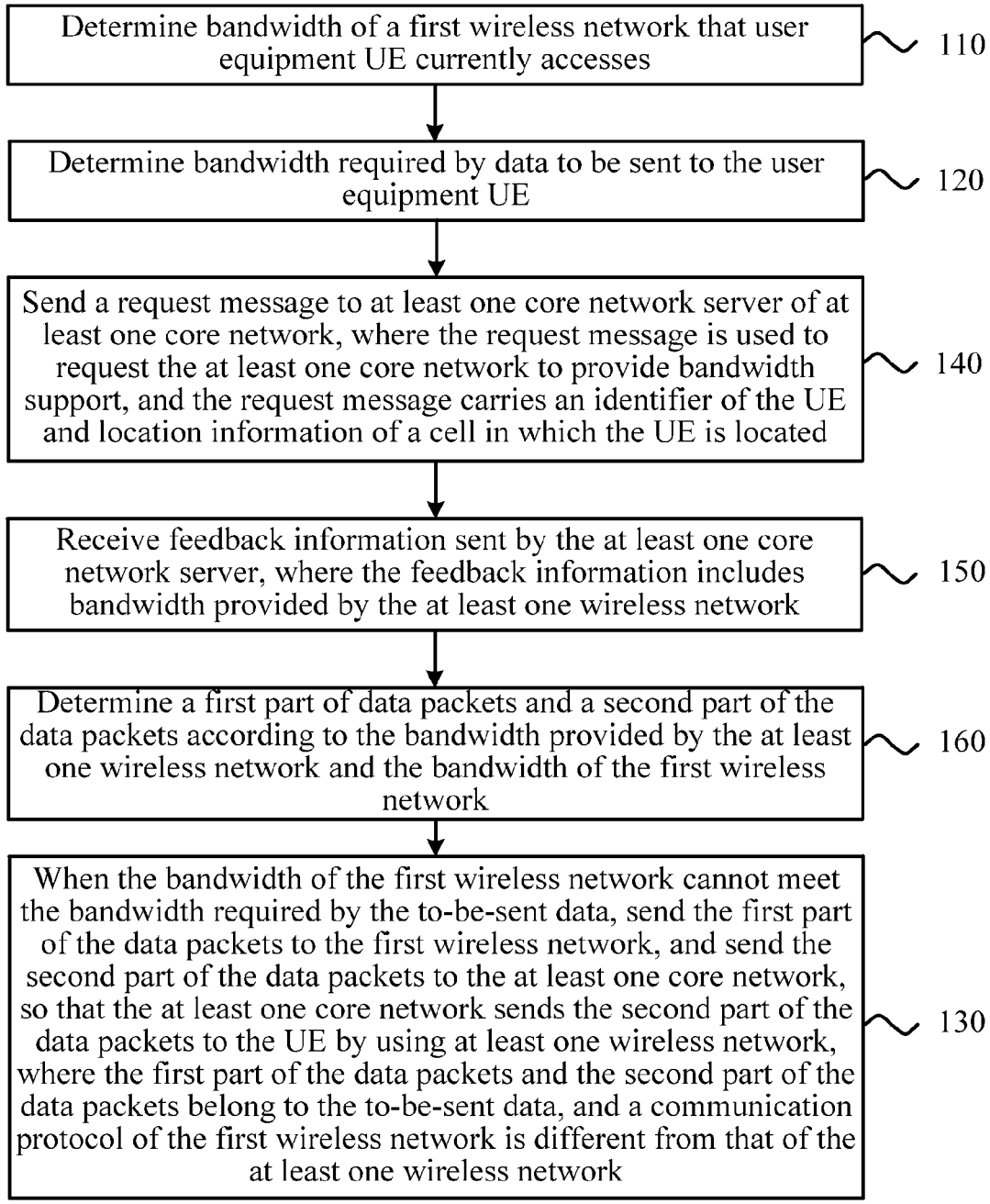
FIG. 2 is a schematic flowchart of a cooperative communication method according to another embodiment of the present disclosure.

As another embodiment, as shown in FIG. 2, when the bandwidth of the first wireless network cannot meet the bandwidth required by the to-be-sent data, before the sending a first part of data packets to the first wireless network, the method 100 further includes the following content Step 140: Send a request message to at least one core network server of the at least one core network, where the request message is used to request the at least one core network to provide bandwidth support, and the request message carries an identifier of the UE and location information of a cell in which the UE is located.

For example, each core network has one core network server.

Step 150: Receive feedback information sent by the at least one core network server, where the feedback information includes bandwidth provided by the at least one wireless network.

For example, each core network server may determine, according to the identifier of the UE and the location information of the cell in which the UE is located that are carried in the request message, bandwidth that can be provided by a wireless network connected to the core network.

Step 160: Determine the first part of the data packets and the second part of the data packets according to the bandwidth provided by the at least one wireless network and the bandwidth of the first wireless network.

In this embodiment of the present disclosure, the cloud server determines, according to the bandwidth fed back by the core network server, data that is sent by the core network to the UE using the wireless network connected to the core network.

As another embodiment, the to-be-sent data in step 120 at least includes: a data packet with a first compression rate and a data packet with a second compression rate, where the first compression rate is less than the second compression rate. Accordingly, the bandwidth required by the to-be-sent data in step 130 includes: bandwidth required by the data packet with the first compression rate in the to-be-sent data. When the bandwidth provided by the at least one wireless network and the bandwidth of the first wireless network meet the bandwidth required by the data packet with the first compression rate in the to-be-sent data, the first part of the data packets and the second part of the data packets both are data packets with the first compression rate; and when the bandwidth provided by the at least one wireless network and the bandwidth of the first wireless network cannot meet the bandwidth required by the data packet with the first compression rate in the to-be-sent data, some or all data packets in both the first part of the data packets and the second part of the data packets are data packets with the second compression rate.

Same content data in the cloud server is stored in a high-definition version, a standard-definition version, or another version. The cloud server may separately packetize a same data stream according to different compression rates, which can meet different network quality requirements. When being stored in cloud, real-time data is stored in a form of a data packet, and is labeled. Label information includes: relevant information of the data packet such as content, a compression rate category, a relative order, and a size.

When a sum of the bandwidth of the first wireless network and the bandwidth provided by the at least one wireless network can meet bandwidth required by a data packet with a low compression rate, the cloud server may send the data packet with a low compression rate to the UE using the first wireless network and the at least one wireless network. When the sum of the bandwidth of the first wireless network and the bandwidth provided by the at least one wireless network cannot meet bandwidth required by a data packet with a low compression rate, if the cloud server still sends the data packet with a low compression rate to the UE using the first wireless network and the at least one wireless network, it is difficult to ensure data fluency. In this case, the cloud server may send some data packets with a low compression rate and some data packets with a high compression rate to the UE; or the cloud server may send a data packet with a high compression rate but not send a data packet with a low compression rate any longer to the UE. In this way, data packets with different compression rates are sent according to bandwidth that can be provided by various wireless networks, which can ensure data fluency.

For example, the cloud server may divide data A into n portions; each portion of data is compressed using a compression rate a, and packetized into data packets $A_{a1}$ to $A_{an}$; and is also compressed using a compression rate b, and packetized into data packets $A_{b1}$ to $A_{bn}$. Alternatively, each portion of data may also be compressed and stored using other compression rates c, d .... Data B is packetized and stored in the same manner. No matter which compression rate is used for compression, a data source of each compressed packet is the same, that is, content remains consistent during packetization for different frame rates and image quality (1080p/1080i/720p or the like). In this way, when quality of a wireless network changes, the cloud server can conveniently select a data packet with a different compression rate according to the change of the wireless network without affecting data continuity after demodulation.

One time frame can include several data packets. Data in each frame may be data packets with a same compression rate, or may be data packets with different compression rates. Initially, in a state in which quality of a wireless network is good, the cloud server sends a data packet whose compression rate is lower (for example, image quality is better) or that requires higher bandwidth (for example, high-definition media). When bandwidth of a wireless network cannot meet bandwidth required by a data packet whose compression rate is lower (for example, image quality is better) or that requires higher bandwidth (for example, high-definition media), calculation is re-executed and some or all data packets that are data packets whose compression rates are higher (for example, image quality is worse) or that require lower bandwidth (for example, standard-definition media) are selected. After receiving the data packets, the UE can obtain required real-time data by merging and decoding the data packets according to label information of the data packets.

It should be understood that, for a user, fluency of real-time data is the first in importance, and image quality is the next. Therefore, in this embodiment of the present disclosure, the image quality needs to be improved on a basis that fluency is met.

For example, it is assumed that bandwidth a is bandwidth required by a high-definition compressed data stream or a data packet with a low compression rate within a next time frame, that is, maximum data bandwidth that a wireless network needs to meet. When quality of the wireless network decreases, wireless bandwidth is affected, and to reach the data bandwidth a for the wireless network, bandwidth of the core network is introduced to meet the need. When a still cannot be met after communication bandwidth of the core network is introduced, assuming that wireless bandwidth that can be provided in this case is β, the cloud server recalculates, and chooses to send some or all standard-definition compressed data streams, data streams with smaller traffic, or data packets with high compression rates, to reduce a bandwidth pressure. That is, fluency of real-time data is maintained to the greatest extent by appropriately sacrificing data or image quality.

In addition, a length of a time frame in this embodiment of the present disclosure should be consistent with a caching time that can be provided by the user equipment. In this way, a user requirement for fluent playback can be met.

Therefore, the cooperative communication method in this embodiment of the present disclosure can implement fluent transmission of real-time data when quality of a wireless network changes, so as to meet optimal experience of a customer.

Optionally, as another embodiment, the method 100 further includes: receiving a performance parameter of the first wireless network reported by the UE, and accordingly, in step 110, the bandwidth of the first wireless network is determined according to the performance parameter of the first wireless network.

The performance parameter may include a received signal strength indication (RSSI) and a packet length of the wireless network.

A wireless local area network automatically adjusts data bandwidth (that is, a transmission rate) according to an RSSI that can be received on a side of an AP. The RSSI determine a maximum rate that can be currently obtained at a physical layer. There have already been a quite number of experience models for signal attenuation prediction, for example, an indoor propagation model, a multipath effect, delay spread, a fading characteristic, and a Doppler effect. In the present disclosure, a mature result in this research direction is used, and details are not described herein again.

A network environment is complex, and actual transmission bandwidth more relies on a packet length. Therefore, in this embodiment of the present disclosure, the cloud server further monitors and collects statistics on the packet length. Using 802.11g transmission with a maximum physical rate of 54 megabits per second (Mbps) as an example, generally in an ideal environment, maximum throughputs are shown in the following Table 1.

TABLE 1

| | |
|---|---|
| Maximum rate at the physical layer | 54 Mbps |
| Theoretical maximum transmission rate (1500-Byte packet) | 22 Mbps; it is assumed that a proportion occupied by the packet is a % |
| Theoretical maximum transmission rate (512-Byte packet) | 14 Mbps; it is assumed that a proportion occupied by the packet is b % |
| Theoretical maximum transmission rate (88-Byte packet) | 3.2 Mbps; it is assumed that a proportion occupied by the packet is c % |

A total throughput that one AP can provide is A*a %+B*b %+C*c % (for multiple APs, a co-channel interference exists, and bandwidth further decreases), where A, B, and C are separately theoretical maximum transmission rates for packets with different lengths. A cloud end counts quantities of packets with different lengths, and calculates occupied proportions.

Generally, for a long packet, bandwidth utilization is high. It is assumed that, a real-time media data stream is sent in a form of a long packet. If a proportion of long packets is less than n, it is considered that the throughput decreases to an unacceptable degree, an impact of a change trend of n on throughput can be obtained using probability statistics. Accordingly, the cloud server takes a corresponding measure according to calculation, for example, suspending some clients whose priorities are not high, or introducing other communication bandwidth. If a media data stream is sent in a form of a short packet, a packet proportion threshold m can also be obtained. An algorithm and a rule are the same as the foregoing.

The parameter of the wireless network is acquired and transmitted to the cloud server, so that the cloud server can determine, with reference to a relevant model, network quality of a channel for the UE within a next time frame.

Therefore, in the cooperative communication method in this embodiment of the present disclosure, when bandwidth of a currently accessed wireless network cannot meet bandwidth required by data transmission, bandwidth support is requested from a core network, so that some data is sent to user equipment by the core network using a wireless network connected to the core network, which can integrate bandwidth resources on wireless networks with different communications protocols, so that fluent transmission of data can be implemented.

Figure 3:
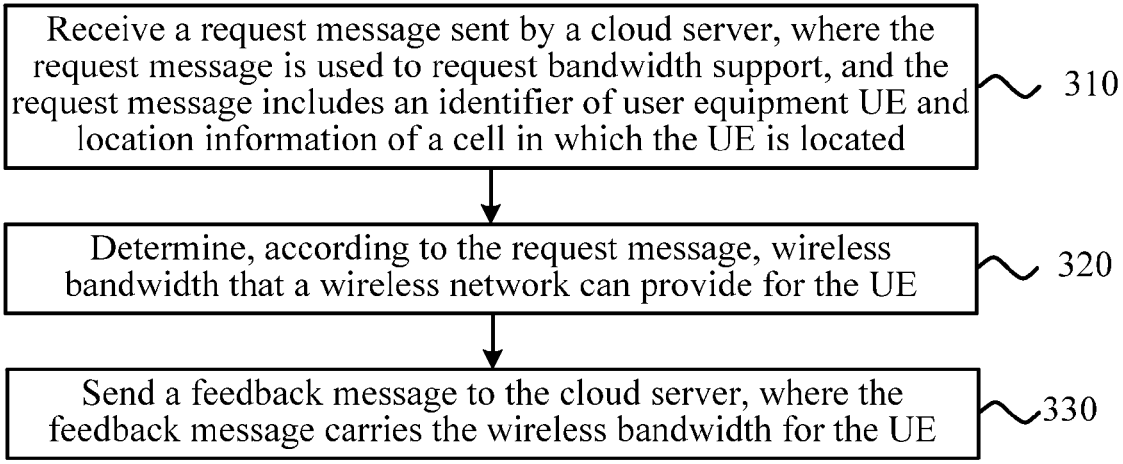
FIG. 3 is a schematic flowchart of a cooperative communication method according to another embodiment of the present disclosure.

FIG. 3 shows a schematic flowchart of a cooperative communication method 300 according to another embodiment of the present disclosure. The method 300 may be executed by a core network server. As shown in FIG. 3, the method 300 includes the following content.

Step 310: Receive a request message sent by a cloud server, where the request message is used to request bandwidth support, and the request message includes an identifier of UE and location information of a cell in which the UE is located.

Step 320: Determine, according to the request message, wireless bandwidth that a wireless network can provide for the UE.

Step 330: Send a feedback message to the cloud server, where the feedback message carries the wireless bandwidth.

Therefore, in a system communications method in this embodiment of the present disclosure, a bandwidth support request from a cloud server is received and responded to, which can integrate bandwidth resources of wireless networks with different communications protocols, thereby implementing fluent transmission of data.

As another embodiment, step 320 may include: determining, according to the location information of the cell in which the UE is located, a wireless network on which the UE is located; establishing a connection to a base station on the wireless network; and acquiring, from the base station, the wireless bandwidth that the wireless network can provide for the UE.

Optionally, as another embodiment, the method 300 further includes: receiving data sent by the cloud server; and sending the data to the UE using the wireless network.

After the core network server sends bandwidth that can be provided for communication with the UE to the cloud server, the core network server feeds back, according to setting of a core network on which the core network server is located, to the cloud server whether the bandwidth support can be provided. If the bandwidth support can be provided, the core network server further confirms the bandwidth that can be provided, and feeds back to the cloud server, and the cloud server determines a data packet to be sent to the core network server.

Therefore, in the system communications method in this embodiment of the present disclosure, a bandwidth support request from a cloud server is received and responded to, so that bandwidth resources of wireless networks with different communications protocols can be integrated, thereby implementing fluent transmission of data.

Figure 4:
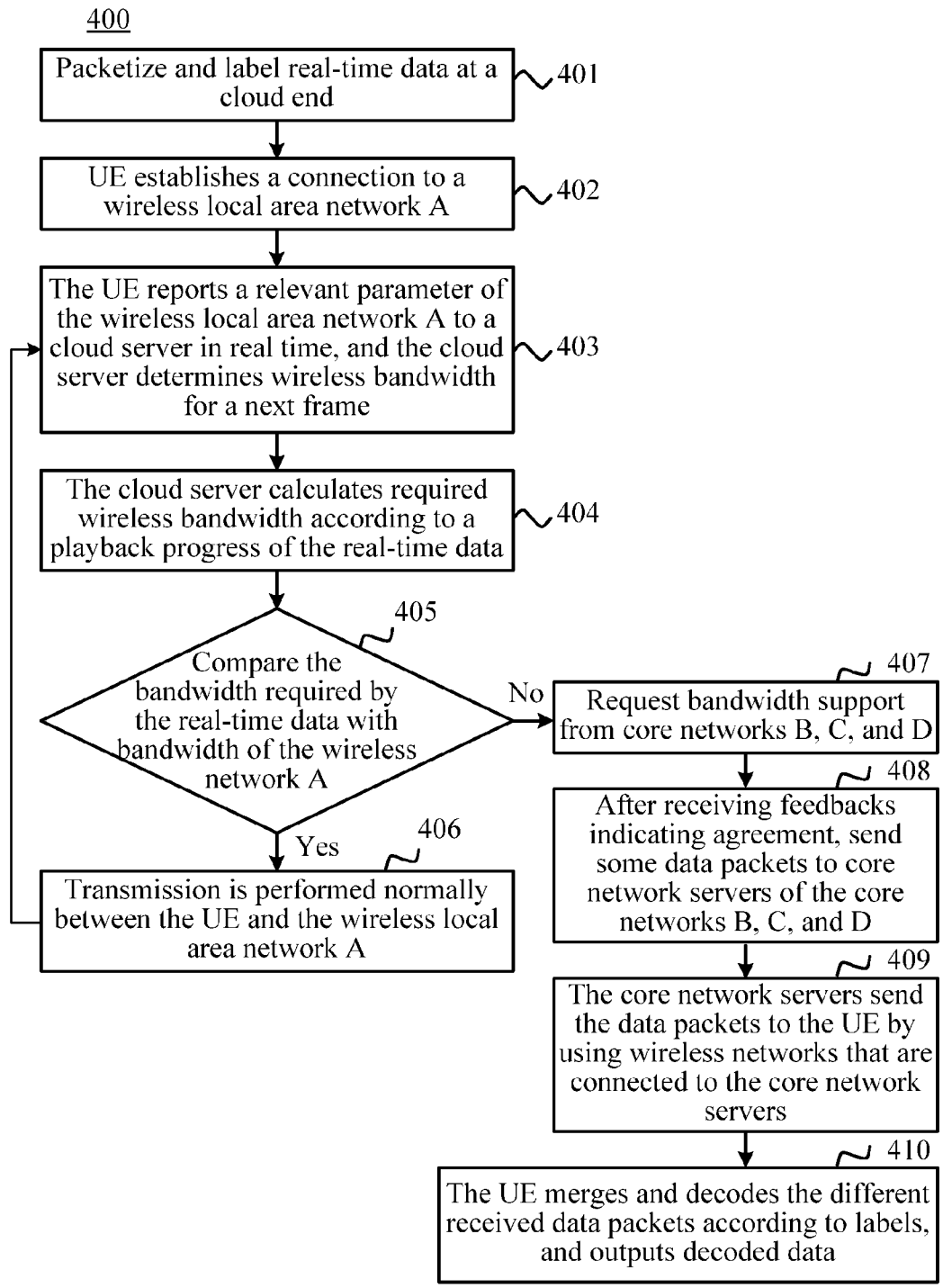
FIG. 4 is a schematic flowchart of a cooperative communication method according to another embodiment of the present disclosure.

The following describes in details a cooperative communication method according to an embodiment of the present disclosure with reference to FIG. 4.

FIG. 4 shows a schematic flowchart of a cooperative communication method 400 according to an embodiment of the present disclosure.

In FIG. 4, it is assumed that, a first wireless network is a wireless local area network A, and a cloud server is connected to core networks B, C, and D. The core networks B, C, and D are separately connected to a wireless network, for example, the wireless network may be a 2G network, a 3G network, or an LTE network.

Step 401: The cloud server separately packetizes, according to different compression rates, a data stream to be sent to UE, to meet different network quality requirements. That is, same content data is stored in a high-definition version, a standard-definition version, or another version. When being stored at a cloud end, real-time data is stored in a form of a data packet, and is labeled. Label information includes: relevant information of the data packet such as content, a category, a relative order, and a size.

Step 402: The UE establishes a wireless connection on the wireless local area network A.

Step 403: The UE collects a performance parameter of the wireless local area network A, and reports the data to the cloud server in real time using an AP. The cloud server predicts network quality, within a next time frame, of the wireless local area network A according to the data reported in real time and a relevant calculation model.

Step 404: The cloud server calculates, according to a real-time data stream sent to the UE, bandwidth required within the next time frame.

Step 405: Compare the bandwidth required by the real-time data within the next time frame with bandwidth that can be ensured by the wireless local area network A. If the wireless network bandwidth within the next time frame can meet a bandwidth requirement of the real-time data, step 406 is performed. Otherwise, step 407 is performed.

Step 406: The UE performs data transmission with the cloud server using the wireless local area network A, and the cloud server continues to monitor network performance of the wireless local area network A according to the performance parameter of the wireless local area network A reported in real time by the UE.

Step 407: The cloud server requests support from the core networks B, C, and D, and provides relevant data of the UE (for example, an identifier of the UE, and location information of a cell in which the UE is located).

Step 408: After receiving feedbacks indicating agreement from the core networks B, C, and D, determine, according to bandwidth information fed back by the core networks, data packets to be sent to the core networks B, C, and D, and then send the corresponding data packets to respective core network servers of the core networks B, C, and D.

Step 409: The core network servers separately send the data packets to the UE using serving base stations of the UE on wireless networks that are connected to the core network servers.

Step 410: After receiving the data packets from the different wireless networks, the UE merges and decodes the data packets according to packet header label information, to obtain the required real-time data.

Therefore, in the cooperative communication method in this embodiment of the present disclosure, when bandwidth of a currently accessed wireless network cannot meet bandwidth required by data transmission, bandwidth support is requested from a core network, so that some data is sent to user equipment by the core network using a wireless network connected to the core network, which can integrate bandwidth resources on wireless networks with different communications protocols, so that fluent transmission of data can be implemented.

It should be noted that, the example in FIG. 4 is intended for helping a person skilled in the art better understand the embodiments of the present disclosure, but not for limiting the scope of the embodiments of the present disclosure. Obviously, a person skilled in the art may perform various equivalent modifications or changes according to the example provided in FIG. 4, and such modifications or changes also fall within the scope of the embodiments of the present disclosure.

It should be understood that, an order of the sequence numbers of each of the foregoing processes does not mean an executing order. The executing order of each process should be determined according to a function and an internal logic of the process, but should not constitute any limitation on implementation processes of the embodiments of the present disclosure.

The foregoing describes in detail the cooperative communication method according to the embodiments of the present disclosure with reference to FIG. 1 to FIG. 4, and the following describes in detail a cloud server and a core network server according to embodiments of the present disclosure with reference to FIG. 5 to FIG. 9.

Figure 5:
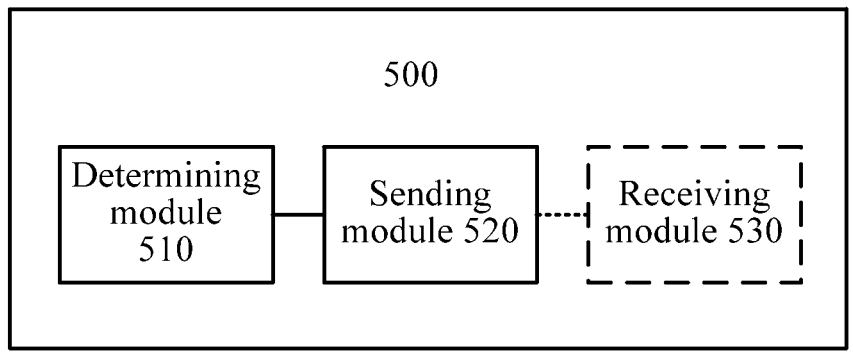
FIG. 5 is a schematic block diagram of a cloud server according to an embodiment of the present disclosure.

FIG. 5 shows a schematic block diagram of a cloud server 500 according to an embodiment of the present disclosure. As shown in FIG. 5, the cloud server 500 includes: a determining module 510 and a sending module 520.

The determining module 510 is configured to determine bandwidth of a first wireless network that UE currently accesses, and further configured to determine bandwidth required by data to be sent to the UE.

The sending module 520 is configured to: when the bandwidth of the first wireless network determined by the determining module 510 cannot meet the bandwidth required by the to-be-sent data, send a first part of data packets to the first wireless network, and send a second part of the data packets to at least one core network, so that the at least one core network sends the second part of the data packets to the UE using at least one wireless network, where the first part of the data packets and the second part of the data packets belong to the to-be-sent data, and a communications protocol of the first wireless network is different from that of the at least one wireless network.

Therefore, with the cloud server in this embodiment of the present disclosure, when bandwidth of a currently accessed wireless network cannot meet bandwidth required by data transmission, bandwidth support is requested from a core network, so that the core network sends some data to user equipment using another wireless network, which can integrate a bandwidth resource on the another wireless network, so that fluent transmission of data can be implemented.

As another embodiment, the cloud server 500 further includes: a receiving module 530. The sending module 520 is further configured to: when the bandwidth of the first wireless network cannot meet the bandwidth required by the to-be-sent data, before the first part of the data packets is sent to the first wireless network, send a request message to at least one core network server of the at least one core network, where the request message is used to request the at least one core network to provide bandwidth support, and the request message carries an identifier of the UE and location information of a cell in which the UE is located. The receiving module 530 is configured to receive feedback information sent by the at least one core network server, where the feedback information includes bandwidth provided by the at least one wireless network. The determining module 510 is further configured to determine the first part of the data packets and the second part of the data packets according to the bandwidth provided by the at least one wireless network and the bandwidth of the first wireless network.

As another embodiment, the to-be-sent data at least includes: a data packet with a first compression rate and a data packet with a second compression rate, where the first compression rate is less than the second compression rate; and the bandwidth required by the to-be-sent data includes: bandwidth required by the data packet with the first compression rate in the to-be-sent data. When the bandwidth provided by the at least one wireless network and the bandwidth of the first wireless network meet the bandwidth required by the data packet with the first compression rate in the to-be-sent data, the first part of the data packets and the second part of the data packets both are data packets with the first compression rate. When the bandwidth provided by the at least one wireless network and the bandwidth of the first wireless network cannot meet the bandwidth required by the data packet with the first compression rate in the to-be-sent data, some or all data packets in both the first part of the data packets and the second part of the data packets are data packets with the second compression rate.

As another embodiment, the receiving module 530 is further configured to receive a performance parameter of the first wireless network reported by the UE, and the determining module 510 is configured to determine the bandwidth of the first wireless network according to the performance parameter of the first wireless network.

It should be understood that, the cloud server 500 according to this embodiment of the present disclosure may correspond to the cloud server in the cooperative communication method 100 according to the foregoing embodiment of the present disclosure, and for the foregoing and other operations and/or functions of the modules in the cloud server 500, reference may be made to a corresponding process of the method 100 in FIG. 1. For brevity, details are not described herein again.

Therefore, with the cloud server in this embodiment of the present disclosure, when bandwidth of a currently accessed wireless network cannot meet bandwidth required by data transmission, bandwidth support is requested from a core network, so that some data is sent to user equipment by the core network using a wireless network connected to the core network, which can integrate bandwidth resources on wireless networks with different communications protocols, so that fluent transmission of data can be implemented.

Figure 6:
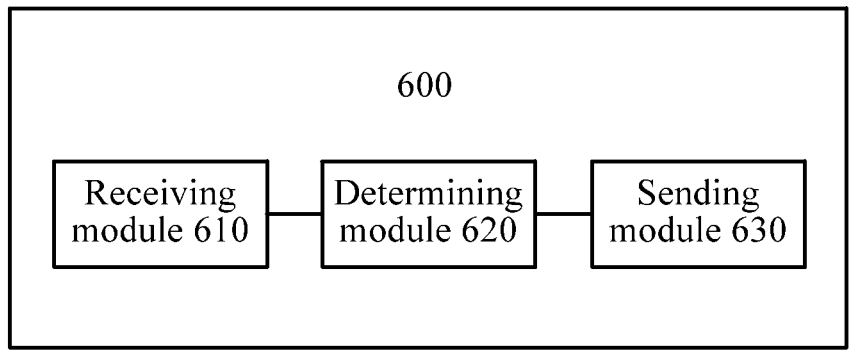
FIG. 6 is a schematic block diagram of a core network server according to an embodiment of the present disclosure.

FIG. 6 shows a schematic block diagram of a core network server 600 according to an embodiment of the present disclosure. As shown in FIG. 6, the cloud server 600 includes: a receiving module 610, a determining module 620, and a sending module 630.

The receiving module 610 is configured to receive a request message sent by a cloud server, where the request message is used to request bandwidth support, and the request message includes an identifier of UE and location information of a cell in which the UE is located.

The determining module 620 is configured to determine, according to the request message, wireless bandwidth that a wireless network can provide for the UE.

The sending module 630 is configured to send a feedback message to the cloud server, where the feedback message carries the wireless bandwidth.

Therefore, with the core network server in this embodiment of the present disclosure, a bandwidth support request from a cloud server is received and responded to, so that bandwidth resources of wireless networks with different communications protocols can be integrated, thereby implementing fluent transmission of data.

Figure 7:
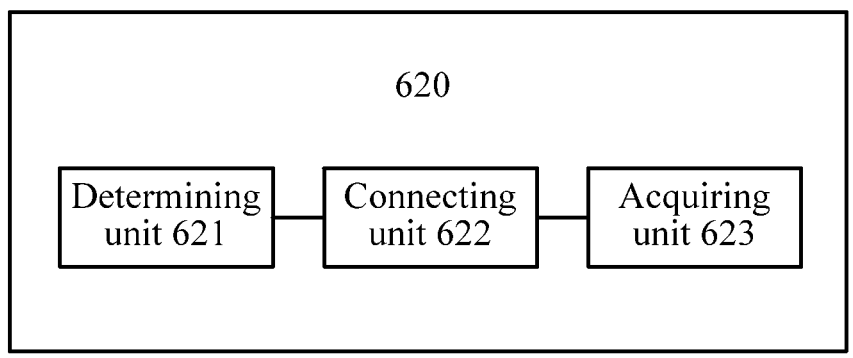
FIG. 7 is a schematic block diagram of a determining module of a core network server according to an embodiment of the present disclosure.

As another embodiment, as shown in FIG. 7, the determining module 620 includes: a determining unit 621 configured to determine, according to the location information of the cell in which the UE is located, a wireless network on which the UE is located; a connecting unit 622 configured to establish a connection to a base station on the wireless network; and an acquiring unit 623 configured to acquire, from the base station, the wireless bandwidth that the wireless network can provide for the UE.

As another embodiment, the receiving module 610 is further configured to receive data sent by the cloud server. The sending module 630 is further configured to send the data to the UE using the wireless network.

It should be understood that, the core network server 600 according to this embodiment of the present disclosure may correspond to the core network server in the cooperative communication method 300 according to the foregoing embodiment of the present disclosure, and for the foregoing and other operations and/or functions of the modules in the core network server 600, reference may be made to a corresponding process of the method 300 in FIG. 3. For brevity, details are not described herein again.

Therefore, with the core network server in this embodiment of the present disclosure, a bandwidth support request from a cloud server is received and responded to, so that bandwidth resources of wireless networks with different communications protocols can be integrated, thereby implementing fluent transmission of data.

Figure 8:
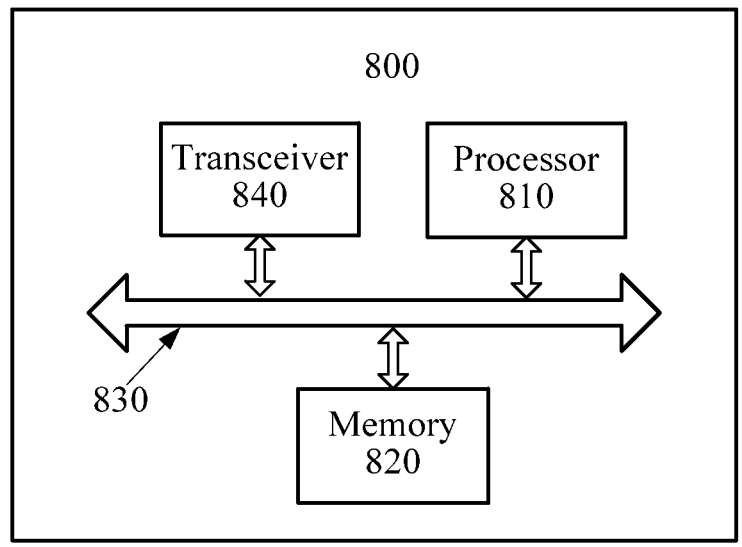
FIG. 8 is a schematic block diagram of a cloud server according to another embodiment of the present disclosure.

FIG. 8 shows a schematic block diagram of a cloud server 800 according to another embodiment of the present disclosure. As shown in FIG. 8, the cloud server 800 includes: a processor 810, a memory 820, a bus system 830, and a transceiver 840. The processor 810, the memory 820, and the transceiver 840 are connected to each other using the bus system 830, the memory 820 is configured to store an instruction, and the processor 810 is configured to execute the instruction stored in the memory 820.

The processor 810 is configured to determine bandwidth of a first wireless network that UE currently accesses, and further configured to determine bandwidth required by data to be sent to the UE. The transceiver 840 is configured to: when the bandwidth of the first wireless network determined by the determining module cannot meet the bandwidth required by the to-be-sent data, send a first part of data packets to the first wireless network, and send a second part of the data packets to at least one core network, so that the at least one core network sends the second part of the data packets to the UE using at least one wireless network, where the first part of the data packets and the second part of the data packets belong to the to-be-sent data, and a communications protocol of the first wireless network is different from that of the at least one wireless network.

Therefore, with the cloud server in this embodiment of the present disclosure, when bandwidth of a currently accessed wireless network cannot meet bandwidth required by data transmission, bandwidth support is requested from a core network, so that some data is sent to user equipment by the core network using a wireless network connected to the core network, which can integrate bandwidth resources on wireless networks with different communications protocols, so that fluent transmission of data can be implemented.

It should be understood that, in this embodiment of the present disclosure, the processor 810 may be a central processing unit (CPU). Or the processor 810 may be another general processor, a digital signal processor (DSP), an application-specific integrated circuit (ASIC), a field-programmable gate array (FPGA) or another programmable logic device, a discrete gate or a transistor logic device, a discrete hardware component, or the like. The general processor may be a microprocessor, or the processor may be any common processor, or the like.

The memory 820 may include a read-only memory and a random access memory, and provide an instruction and data to the processor 810. A part of the memory 820 may further include a nonvolatile random access memory. For example, the memory 820 may further store information about a device type.

In addition to a data bus, the bus system 830 may further include a power bus, a control bus, a state signal bus, and so on. However, for the purpose of clear description, all buses are marked as the bus system 830 in the figure.

In a process of implementation, steps of the method may be completed using an integrated logic circuit in hardware in the processor 810 or instructions in a software form. The steps of the method disclosed in combination with the embodiments of the present disclosure may be directly embodied as being executed and completed by a hardware processor or executed and completed by a combination of hardware and software modules in the processor. The software module may be located in a mature storage medium in the art, such as a random access memory, a flash memory, a read-only memory, a programmable read-only memory, an electronically erasable programmable memory, or a register. The storage medium is located in the memory 820, and the processor 810 reads information in the memory 820, and completes the steps of the foregoing method using the hardware of the processor 810. To avoid repetition, details are not described herein again.

As another embodiment, the transceiver 840 is further configured to: when the bandwidth of the first wireless network cannot meet the bandwidth required by the to-be-sent data, before the first part of the data packets is sent to the first wireless network, send a request message to at least one core network server of the at least one core network, where the request message is used to request the at least one core network to provide bandwidth support, and the request message carries an identifier of the UE and location information of a cell in which the UE is located; and receive feedback information sent by the at least one core network server, where the feedback information includes bandwidth provided by the at least one wireless network. The processor 810 is further configured to determine the first part of the data packets and the second part of the data packets according to the bandwidth provided by the at least one wireless network and the bandwidth of the first wireless network.

As another embodiment, the to-be-sent data at least includes: a data packet with a first compression rate and a data packet with a second compression rate, where the first compression rate is less than the second compression rate; and the bandwidth required by the to-be-sent data includes: bandwidth required by the data packet with the first compression rate in the to-be-sent data. When the bandwidth provided by the at least one wireless network and the bandwidth of the first wireless network meet the bandwidth required by the data packet with the first compression rate in the to-be-sent data, the first part of the data packets and the second part of the data packets both are data packets with the first compression rate. When the bandwidth provided by the at least one wireless network and the bandwidth of the first wireless network cannot meet the bandwidth required by the data packet with the first compression rate in the to-be-sent data, some or all data packets in both the first part of the data packets and the second part of the data packets are data packets with the second compression rate.

As another embodiment, the transceiver 840 is further configured to receive a performance parameter of the first wireless network reported by the UE, and the processor 810 is configured to determine the bandwidth of the first wireless network according to the performance parameter of the first wireless network.

It should be understood that, the cloud server 800 according to this embodiment of the present disclosure may correspond to the cloud server in the cooperative communication method 100 according to the foregoing embodiment of the present disclosure, and for the foregoing and other operations and/or functions of the modules in the cloud server 800, reference may be made to a corresponding process of the method 100 in FIG. 1. For brevity, details are not described herein again.

Therefore, with the cloud server in this embodiment of the present disclosure, when bandwidth of a currently accessed wireless network cannot meet bandwidth required by data transmission, bandwidth support is requested from a core network, so that some data is sent to user equipment by the core network using a wireless network connected to the core network, which can integrate bandwidth resources on wireless networks with different communications protocols, so that fluent transmission of data can be implemented.

Figure 9:
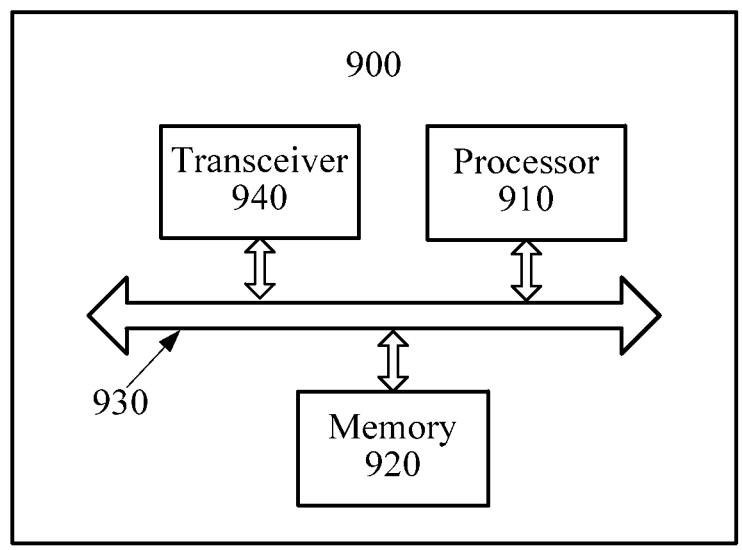
FIG. 9 is a schematic block diagram of a core network server according to another embodiment of the present disclosure.

FIG. 9 shows a schematic block diagram of a core network server 900 according to another embodiment of the present disclosure. As shown in FIG. 9, the core network server 900 includes: a processor 910, a memory 920, a bus system 930, and a transceiver 940. The processor 910, the memory 920, and the transceiver 940 are connected to each other using the bus system 930, the memory 920 is configured to store an instruction, and the processor 910 is configured to execute the instruction stored in the memory 920.

The transceiver 940 is configured to receive a request message sent by a cloud server, where the request message is used to request bandwidth support, and the request message includes an identifier of UE and location information of a cell in which the UE is located. The processor 910 is configured to determine, according to the request message, wireless bandwidth that a wireless network can provide for the UE. The transceiver 940 is further configured to send a feedback message to the cloud server, where the feedback message carries the wireless bandwidth.

Therefore, with the core network server in this embodiment of the present disclosure, a bandwidth support request from a cloud server is received and responded to, so that bandwidth resources of wireless networks with different communications protocols can be integrated, thereby implementing fluent transmission of data.

It should be understood that, in this embodiment of the present disclosure, the processor 910 may be a CPU, or the processor 910 may be another general processor, a DSP, an ASIC, a FPGA or another programmable logic device, a discrete gate or a transistor logic device, a discrete hardware component, or the like. The general processor may be a microprocessor, or the processor may be any common processor, or the like.

The memory 920 may include a read-only memory and a random access memory, and provide an instruction and data to the processor 910. A part of the memory 920 may further include a nonvolatile random access memory. For example, the memory 920 may further store information about a device type.

In addition to a data bus, the bus system 930 may further include a power bus, a control bus, a state signal bus, and so on. However, for the purpose of clear description, all buses are marked as the bus system 930 in the figure.

In a process of implementation, steps of the method may be completed using an integrated logic circuit in hardware in the processor 910 or instructions in a software form. The steps of the method disclosed in combination with the embodiments of the present disclosure may be directly embodied as being executed and completed by a hardware processor or executed and completed by a combination of hardware and software modules in the processor. The software module may be located in a mature storage medium in the art, such as a random access memory, a flash memory, a read-only memory, a programmable read-only memory, an electronically erasable programmable memory, or a register. The storage medium is located in the memory 920, and the processor 910 reads information in the memory 920, and completes the steps of the method using the hardware of the processor 910. To avoid repetition, details are not described herein again.

As another embodiment, the processor 910 is further configured to determine, according to the location information of the cell in which the UE is located, a wireless network on which the UE is located. The transceiver 940 is further configured to establish a connection to a base station on the wireless network, and acquire, from the base station, the wireless bandwidth that the wireless network can provide for the UE.

As another embodiment, the transceiver 940 is further configured to receive data sent by the cloud server, and send the data to the UE using the wireless network.

It should be understood that, the core network server 900 according to this embodiment of the present disclosure may correspond to the core network server in the cooperative communication method 300 according to the foregoing embodiment of the present disclosure, and for the foregoing and other operations and/or functions of the modules in the core network server 900, reference may be made to a corresponding process of the method 300 in FIG. 3. For brevity, details are not described herein again.

Therefore, with the core network server in this embodiment of the present disclosure, a bandwidth support request from a cloud server is received and responded to, so that bandwidth resources of wireless networks with different communications protocols can be integrated, thereby implementing fluent transmission of data.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed in a form of hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a random access memory (RAM), a read-only memory (ROM), an electrically erasable programmable read-only memory (EEPROM), a compact disc read-only memory (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A cooperative communication method, wherein the method is executed by a cloud server, wherein the cloud server is connected to multiple core networks, and wherein the method comprises:
   determining bandwidth of a first wireless network that user equipment (UE) currently accesses;
   determining bandwidth required by data to be sent to the UE;
   sending a first part of data packets to the first wireless network when the bandwidth of the first wireless network cannot reach the bandwidth required by the data to be sent to the UE; and
   sending a second part of the data packets to at least one core network of the multiple core networks when the bandwidth of the first wireless network cannot reach the bandwidth required by the data to be sent to the UE, so that the at least one core network sends the second part of the data packets to the UE using at least one wireless network, wherein the first part of the data packets and the second part of the data packets belong to the data to be sent to the UE, and wherein a communications protocol of the first wireless network is different from that of the at least one wireless network.

2. The method according to claim 1, wherein when the bandwidth of the first wireless network cannot meet the bandwidth required by the data to be sent to the UE, before sending the first part of the data packets to the first wireless network, the method further comprises:
   sending a request message to at least one core network server of the at least one core network, wherein the request message is used to request the at least one core network to provide bandwidth support, and wherein the request message carries an identifier of the UE and location information of a cell in which the UE is located;
   receiving feedback information sent by the at least one core network server, wherein the feedback information comprises bandwidth provided by the at least one wireless network; and
   determining the first part of the data packets and the second part of the data packets according to the bandwidth provided by the at least one wireless network and the bandwidth of the first wireless network.

3. The method according to claim 2, wherein the data to be sent to the UE comprises:
   a first data packet with a first compression rate; and
   a second data packet with a second compression rate, wherein the first compression rate is less than the second compression rate,
   wherein the bandwidth required by the data to be sent to the UE comprises bandwidth required by the first data packet with the first compression rate in the data to be sent to the UE,
   wherein when the bandwidth provided by the at least one wireless network and the bandwidth of the first wireless network meet the bandwidth required by the first data packet with the first compression rate in the data to be sent to the UE, the first part of the data packets and the second part of the data packets are both the first data packets with the first compression rate, and
   wherein when the bandwidth provided by the at least one wireless network and the bandwidth of the first wireless network cannot meet the bandwidth required by the first data packet with the first compression rate in the data to be sent to the UE, at least a part of the first part of the data packets and the second part of the data packets are the second data packets with the second compression rate.

4. The method according to claim 1, further comprising receiving a performance parameter of the first wireless network reported by the UE, wherein determining the bandwidth of the first wireless network that the UE currently accesses comprises determining the bandwidth of the first wireless network according to the performance parameter of the first wireless network.

5. A cooperative communication method, comprising:
   receiving a request message sent by a cloud server, wherein the request message is used to request bandwidth support, and wherein the request message comprises an identifier of user equipment (UE) and location information of a cell in which the UE is located;
   determining, according to the location information of the cell in which the UE is located, a wireless network on which the UE is located;
   establishing a connection to a base station on the wireless network;
   acquiring, from the base station, wireless bandwidth that the wireless network can provide for the UE; and
   sending a feedback message to the cloud server, wherein the feedback message carries the wireless bandwidth.

6. The method according to claim 5, further comprising:
   receiving data sent by the cloud server; and
   sending the data to the UE using the wireless network.

7. A cloud server, wherein the cloud server is connected to multiple core networks, and wherein the cloud server comprises:
   a processor configured to:
      determine bandwidth of a first wireless network that user equipment (UE) currently accesses; and
      determine bandwidth required by data to be sent to the UE; and
   a transmitter coupled to the processor and configured to:
      send a first part of data packets to the first wireless network when the bandwidth of the first wireless network determined by the processor cannot meet the bandwidth required by the data to be sent to the UE; and
      send a second part of the data packets to at least one core network, so that the at least one core network sends the second part of the data packets to the UE using at least one wireless network, wherein the first part of the data packets and the second part of the data packets belong to the data to be sent to the UE, and wherein a communications protocol of the first wireless network is different from that of the at least one wireless network.

8. The cloud server according to claim 7, wherein the transmitter is further configured to send a request message to at least one core network server of the at least one core network when the bandwidth of the first wireless network cannot meet the bandwidth required by the data to be sent to the UE, before the first part of the data packets is sent to the first wireless network, wherein the request message is used to request the at least one core network to provide bandwidth support, and wherein the request message carries an identifier of the UE and location information of a cell in which the UE is located,
   wherein the cloud server further comprises a receiver configured to receive feedback information sent by the at least one core network server, wherein the feedback information comprises bandwidth provided by the at least one wireless network, and
wherein the processor is further configured to determine the first part of the data packets and the second part of the data packets according to the bandwidth provided by the at least one wireless network and the bandwidth of the first wireless network.

9. The cloud server according to claim 8, wherein the data to be sent to the UE comprises:
a first data packet with a first compression rate; and
a second data packet with a second compression rate,
wherein the first compression rate is less than the second compression rate,
wherein the bandwidth required by the data to be sent to the UE comprises bandwidth required by the first data packet with the first compression rate in the data to be sent to the UE,
wherein when the bandwidth provided by the at least one wireless network and the bandwidth of the first wireless network meet the bandwidth required by the first data packet with the first compression rate in the data to be sent to the UE, the first part of the data packets and the second part of the data packets are both the first data packets with the first compression rate, and
wherein when the bandwidth provided by the at least one wireless network and the bandwidth of the first wireless network cannot meet the bandwidth required by the first data packet with the first compression rate in the data to be sent to the UE, at least a portion of the first part of the data packets and the second part of the data packets are the second data packets with the second compression rate.

10. The cloud server according to claim 8, wherein the receiver is further configured to receive a performance parameter of the first wireless network reported by the UE, and wherein the processor is configured to determine the bandwidth of the first wireless network according to the performance parameter of the first wireless network.

11. A core network server, comprising:
a receiver configured to receive a request message sent by a cloud server, wherein the request message is used to request bandwidth support, and wherein the request message comprises an identifier of user equipment (UE) and location information of a cell in which the UE is located;
a processor coupled to the receiver and configured to:
determine, according to the location information of the cell in which the UE is located, a wireless network on which the UE is located;
establish a connection to a base station on the wireless network; and
acquire, from the base station, wireless bandwidth that the wireless network can provide for the UE; and
a transmitter coupled to the processor and configured to send a feedback message to the cloud server, wherein the feedback message carries the wireless bandwidth.

12. The core network server according to claim 11, wherein the receiver is further configured to receive data sent by the cloud server, and wherein the transmitter is further configured to send the data to the UE using the wireless network.

* * * * *